US006572950B2

(12) United States Patent
Tsuji

(10) Patent No.: US 6,572,950 B2
(45) Date of Patent: Jun. 3, 2003

(54) LAMINATE KEY SHEET

(75) Inventor: Akihiro Tsuji, Tokyo (JP)

(73) Assignee: Polymatech Co., Ltd. (JP)

(*) Notice: Subject to any disclaimer, the term of this patent is extended or adjusted under 35 U.S.C. 154(b) by 0 days.

(21) Appl. No.: 09/870,166

(22) Filed: May 30, 2001

(65) Prior Publication Data

US 2001/0052380 A1 Dec. 20, 2001

(30) Foreign Application Priority Data

Jun. 15, 2000 (JP) ....................................... 2000-179845

(51) Int. Cl.[7] ........................... B32B 3/10; H01H 13/14; H01H 3/12; H01H 13/70; H01H 1/10; B41J 5/08; B41J 5/12; B41J 5/16; B41J 5/28

(52) U.S. Cl. ....................... 428/138; 428/131; 428/134; 428/137; 200/513; 200/345; 200/516; 200/517; 200/341; 200/344; 400/490; 400/494; 400/495

(58) Field of Search ................................ 428/131, 134, 428/137, 138; 379/441, 456, 156, 433, 362, 364, 368, 369, 370, 433.06, 433.07; 179/184; 200/302.2, 520, 512, 521, 513, 516, 517, 345; 400/494, 495, 496; 414/909; D14/320, 338, 340, 142, 148, 150, 151, 399; D18/6, 7, 12.2

(56) References Cited

U.S. PATENT DOCUMENTS

| | | | | | |
|---|---|---|---|---|---|
| 3,728,509 | A | * | 4/1973 | Shimojo | 200/159 B |
| 4,501,936 | A | * | 2/1985 | Morse | 179/184 |
| 4,774,501 | A | * | 9/1988 | Ikeya | 340/365 |
| 4,839,474 | A | * | 6/1989 | Hayes-Pankhurst et al. | 200/5 A |
| 5,021,638 | A | * | 6/1991 | Nopper et al. | 235/145 R |
| 5,873,454 | A | * | 2/1999 | Nakamura | 200/514 |
| 6,023,033 | A | * | 2/2000 | Yagi et al. | 200/512 |
| 6,103,346 | A | * | 8/2000 | Nakajo et al. | 156/244.16 |
| 6,322,875 | B1 | * | 11/2001 | Kimura | 428/195 |
| 6,383,604 | B1 | * | 5/2002 | Yoo et al. | 200/512 |

* cited by examiner

*Primary Examiner*—Harold Pyon
*Assistant Examiner*—Patricia L. Nordmeyer
(74) *Attorney, Agent, or Firm*—McGlew and Tuttle, P.C.

(57) ABSTRACT

The present invention relates to a laminate key sheet wherein a key sheet of a resin film having a display section is bent into a same form as the top and side faces of each resin button in order to be integrated with the resin button and where a cut-out is formed between the resin buttons. A rubber elastic sheet and the resin film are connected together through an adhesive interposing between an area between resin buttons of the key sheet and the rubber elastic sheet.

7 Claims, 4 Drawing Sheets

LAMINATE KEY SHEET

BACKGROUND OF THE INVENTION

1. Technical Field of Invention

The present invention concerns a key sheet of press-button switches to be built in the input section of phone, mobile communication equipment, audio equipment, remote control, on-vehicle equipment or the like.

2. Prior Art

In recent years, according to minimization and mobilization of electric and electronic equipment, it is also required to miniaturize, and to reduce the thickness and weight of press-button switches used for their operation section.

To respond to this demand, as shown in FIG. 3, it has been known a key sheet, wherein a resin button is formed, by printing predetermined characters, symbols 7 on the top surface or back of a flexible transparent or semi-transparent resin film 1, bending this resin film upward, and at the same time, directly heat fusing thermoplastic resin in the bent portion, or adhering resin in the bent portion of this resin film through an adhesive layer.

However, in the key sheet of the prior art, when the resin button 2 is pressed, adjacent resin button move together inconveniently.

In order to avoid this problems, key sheet compositions wherein a recess 6 is formed approximately at the center of the resin film between resin buttons 2, as shown in FIG. 4, or wherein a notch 3 is formed in the resin film between resin buttons 2, as shown in FIG. 5 have been proposed.

These conventional compositions certainly prevent adjacent resin buttons 2 from moving together; however, in the former composition, the resin button interval can not be reduced, and in the latter, dust or water drops may easily enter the equipment inside through the key top.

SUMMARY OF THE INVENTION

In order to solve the aforementioned problems, the present invention intends to provide a key sheet having a rubber elastic sheet formed integrally at the key sheet bottom face, allowing to reduce the resin button interval all the way preventing adjacent resin buttons from moving together when the resin button is pressed, and further presenting a dust-proof or drip-proof function.

In short, it concerns a laminate key sheet wherein a key sheet of a resin film having a display section is bent into a same form as a top face side of a resin button and integrated with the resin button and a rubber elastic sheet are formed integrally through an adhesive.

Moreover, it concerns a laminate key sheet wherein a notch is formed between key sheet resin buttons of the sheet.

Further, it concerns a laminate key sheet wherein an adhesive interposes between an area between resin buttons of the key sheet and a rubber elastic sheet.

DETAILED DESCRIPTION OF THE PREFERRED EMBODIMENTS

The key sheet of the present invention is a laminate key sheet wherein a key sheet of a resin film having a display section is bent into a same form as a top face side of a resin button and integrated with the resin button and a rubber elastic sheet are formed integrally through an adhesive.

A representative embodiment is, as shown in FIG. 1, a laminate key sheet wherein a key sheet of a resin film 1 having a display section is bent into a same form as the resin button 2 top face side and integrated with the resin button 2 and a cut-out 3 formed between resin buttons, and a rubber elastic sheet 4 are formed integrally through an adhesive 5 interposing between an area between resin buttons of the key sheet 2 and a rubber elastic sheet 4.

Now the embodiment will be described referring to drawings.

Embodiment 1

Figure 1A:
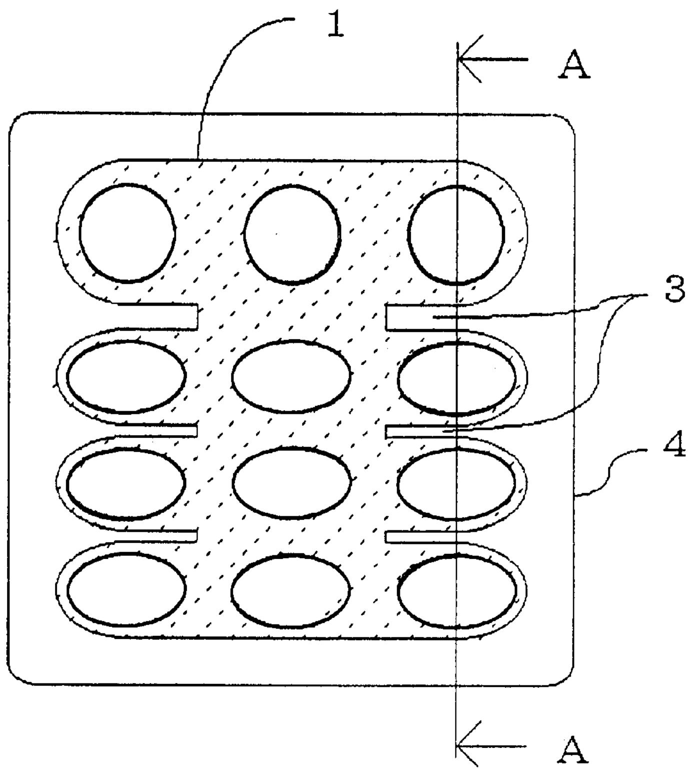
FIG. 1 shows a top view (a) and a cross section (b) along A—A of a representative embodiment of the invention.
Figure 1B:
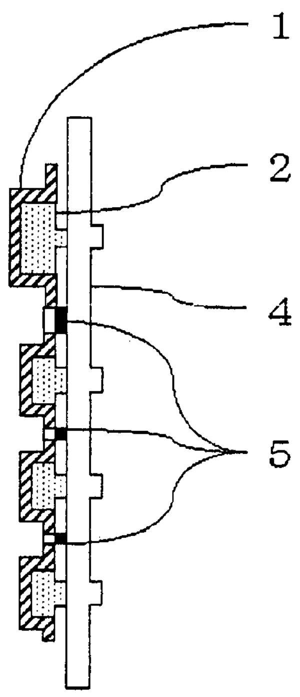
Figure 2A:
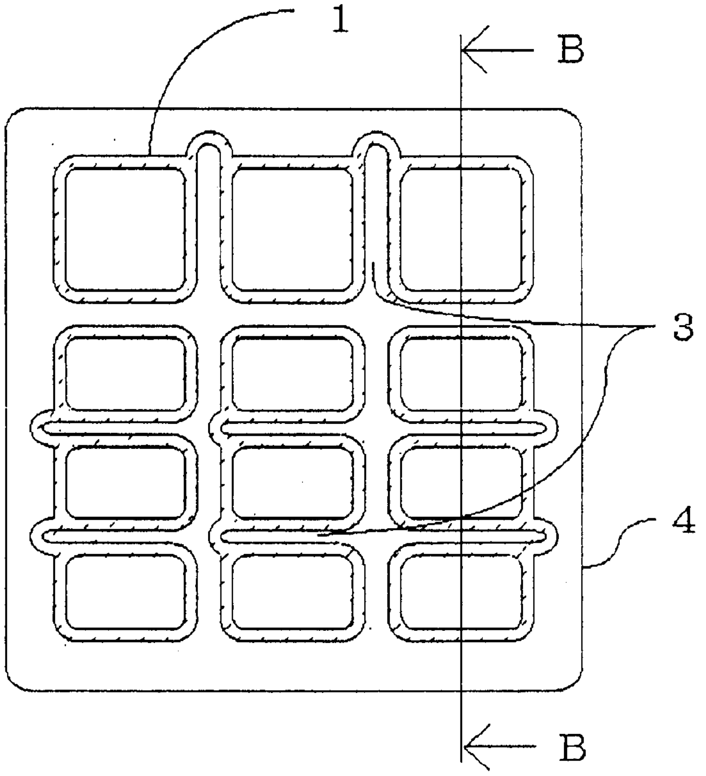
FIG. 2 shows a top view (a) and a cross section (b) along B—B of this embodiment.
Figure 2B:
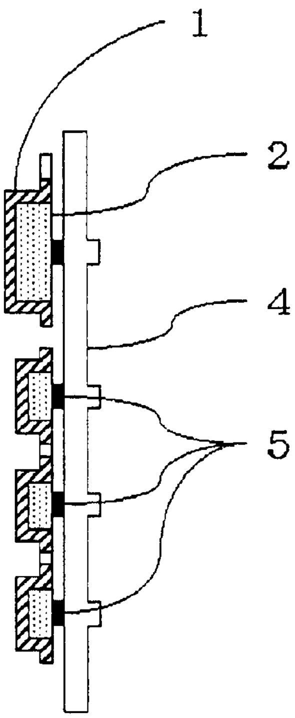
Figure 3:
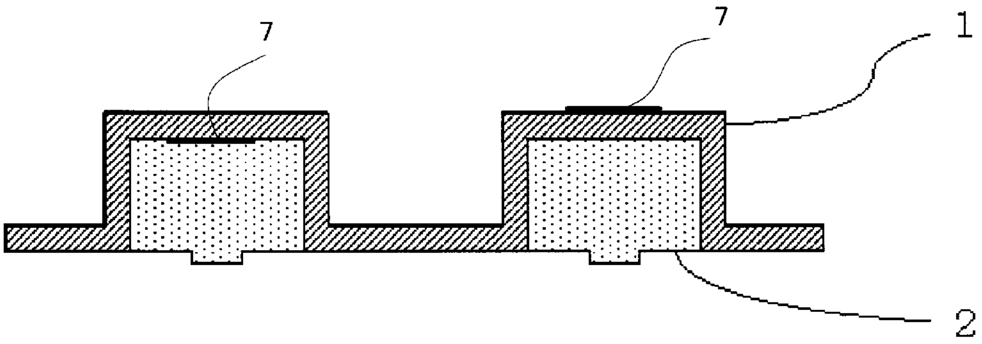
F I G. 3 PRIOR ART
FIG. 3 shows a longitudinal cross section of a conventional key sheet.
Figure 4:
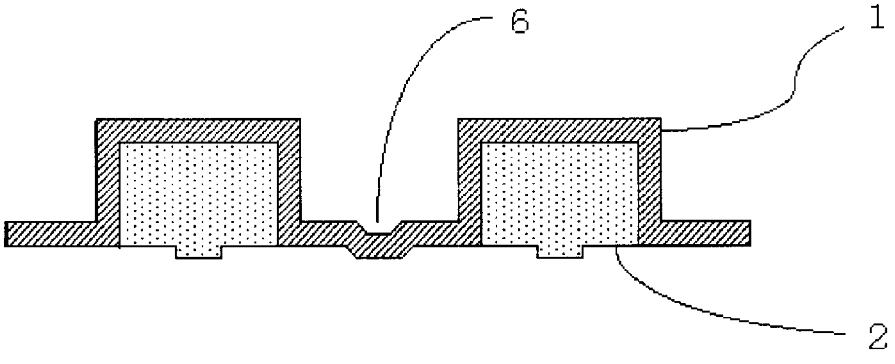
F I G. 4 PRIOR ART
FIG. 4 shows a longitudinal cross section of another conventional key sheet.
Figure 5:
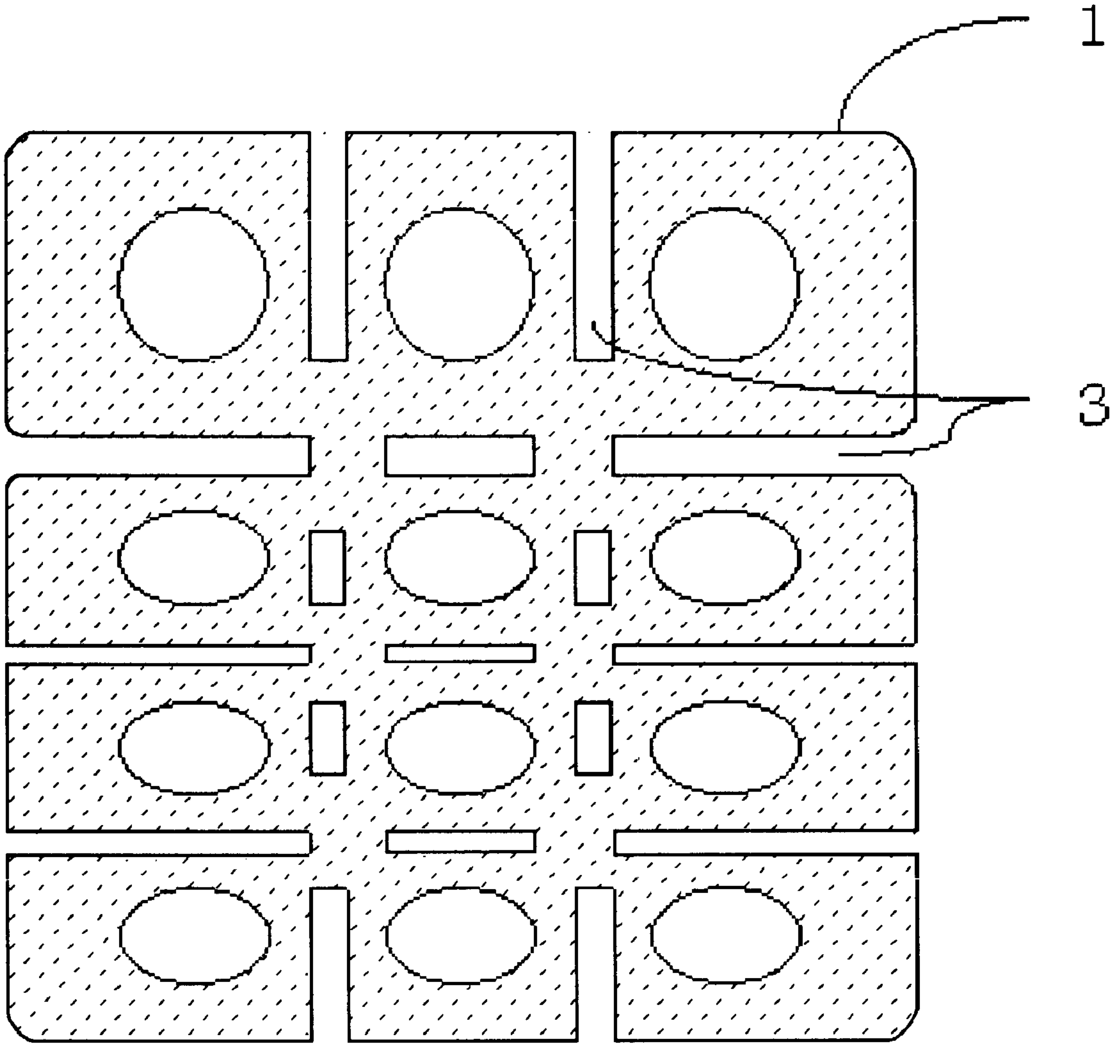
FIG. 5 PRIOR ART
FIG. 5 shows a top face of a still another conventional key sheet.

The embodiment 1 is, as shown in FIG. 2, a key sheet wherein a resin film 1 made of polyethylene terephthalate and provided with characters, symbols or the like printed with urethane base ink on the back is bent into a same form as the resin button 2 top face side and integrated with the resin button 2 and a cut-out 3 formed among a set of three resin buttons, and respective resin button is linked with adjacent resin buttons through a horizontally bending resin film 1. It concerns a laminate key sheet wherein this key sheet and a rubber elastic sheet 4 made of silicone rubber are adhered and integrated by a ultraviolet setting type adhesive 5 for respective resin button.

The cut-out 3 shape and adhesive 5 application position are not specially limited, and for example, the adhesion position may be the back of the resin film 1 coupling resin buttons other than the resin button back.

Effect of the Invention

The present invention intends to provide a key sheet having a rubber elastic sheet formed integrally at the key sheet bottom face, allowing to reduce the resin button interval all the way preventing adjacent resin buttons from moving together when the resin button is pressed, and further presenting a dust-proof and drip-proof function.

In addition, respective resin buttons are not cut off in the manufacturing process, and coupled with adjacent resin buttons and the resin film, allowing to provide a key sheet with high productivity and low cost.

Moreover, the elasticity of the rubber elastic sheet assures a good click feeling, and increases the durability of a disk spring or the like arranged on the laminate key sheet bottom face. If the outer periphery of the rubber elastic sheet is fixed to the case, the equipment can be made water-proof.

What is claimed is:

1. A laminate key sheet comprising:

a rubber elastic sheet;

a plurality of resin buttons;

a resin film bent into a same form as the top and side faces of each of said plurality of resin buttons, each of said resin buttons are linked with an adjacent resin button through a portion of said resin film that is bent to extend horizontally;

a plurality of cut-outs formed in the resin film between the plurality of buttons to form a curved belt of resin having a curved extent connecting between adjacent buttons that is greater than a distance between said adjacent buttons; and an adhesive applied to the resin film between the resin film remaining between the plurality of resin buttons of the key sheet and portions of the rubber elastic sheet corresponding to the resin film between said adjacent buttons.

2. A method of producing a laminate key sheet, comprising the steps of:

providing a resin film with a printed display section;

forming a key sheet by bending the resin film into the same form us a top face and vertical sides of each of a plurality of ream buttons and firming the resin film integrally with the plurality of resin buttons;

forming a cut-out in the resin film between the plurality of resin buttons with a horizontally extending resin film remaining between the plurality of buttons, the horizontally extending resin film being bent relative to resin integrated with vertical sides of each of a plurality of resin buttons;

applying an adhesive to at least one portion of a back of said horizontally extending resin film remaining between the plurality of resin buttons after the cut-out is formed; and forming the key sheet integrally with a rubber elastic sheet through the adhesive.

3. A laminated key sheet comprising:

an elastic sheet;

a plurality of buttons arranged on said elastic sheet, said plurality of buttons are spaced from each other;

a resin film ranged on one end of said buttons diametrically opposite said elastic sheet, said resin film extending from said one end of said buttons along sides of said buttons and along said elastic sheet said resin film extending between said buttons to adjacent said buttons, said resin film defining cutouts between said buttons to provide a horizontally bending resin film remaining between said buttons;

an adhesive connecting said resin film to said elastic sheet, said adhesive connecting said resin film to said elastic sheet in an area between said buttons, said adhesive directly connecting said horizontally bending resin film to said elastic sheet.

4. A laminated key sheet in accordance with claim 3, wherein:

said horizontally bending resin film remaining between said buttons is a curved belt shape portion extending between buttons, the curved belt shape portion having a total curved extent that is greater than a distance between said adjacent buttons defining flexible connection means for maintaining one of said buttons substantially un-activated when an adjacent said button is activated.

5. A laminated key sheet in accordance with claim 4, wherein:

said flexible connection means of said resin film is adjusted by varying a size of said resin film between said buttons.

6. A laminated key sheet in accordance with claim 4, wherein:

said flexible connection means of said resin film is adjusted by varying a size of said curved belt.

7. A laminated key sheet in accordance with claim 3, wherein:

said buttons include resin;

said elastic sheet includes rubber.

* * * * *